United States Patent

[11] 3,618,023

[72] Inventor Theodore Parker
 Findlay, Ohio
[21] Appl. No. 729,969
[22] Filed May 17, 1968
[45] Patented Nov. 2, 1971
[73] Assignee Marathon Oil Company
 Findlay, Ohio

[54] SYSTEM FOR COMBINING A PLURALITY OF PULSES INTO A SINGLE PULSE TRAIN
 3 Claims, 2 Drawing Figs.
[52] U.S. Cl. .................................... 340/150, 340/183
[51] Int. Cl. ...................................... H04q 9/00
[50] Field of Search ........................... 340/147, 183, 177, 151, 413, 239, 150

[56] References Cited
UNITED STATES PATENTS
| | | | |
|---|---|---|---|
| 3,144,046 | 8/1964 | Seesselberg .................. | 340/239 X |
| 3,500,132 | 3/1970 | Garrett ........................ | 340/239 X |
| 2,937,369 | 5/1960 | Newbold et al. .............. | 340/183 X |
| 3,132,329 | 5/1964 | Penser ......................... | 340/183 |
| 3,312,966 | 4/1967 | Schaller ....................... | 340/239 |

*Primary Examiner*—Donald J. Yusko
*Attorneys*—Joseph C. Herring, Richard C. Willson, Jr., Jack L. Hummel and Sughrue, Rothwell, Mion, Zinn & Macpeak ABSTRACT: A system for receiving pulses from a plurality of devices which measure a quantity such as fluid flow and for storing separately the pulses from each such device in individual storage elements. The individual storage elements are sequentially interrogated to provide output pulses onto a common output line from the elements which are storing pulses.

SYSTEM FOR COMBINING A PLURALITY OF PULSES INTO A SINGLE PULSE TRAIN

BACKGROUND OF THE INVENTION

1. Field of the Invention

This invention relates to a system for receiving, from a number of individual measuring devices, pulses which represent the amount of some quantity measured, and for combining the information represented by the pulses into a single pulse train. 2.

Description of the Prior Art

Some prior art systems have used analog measurement signals as inputs to a multiplexing arrangement. Other systems which have combined pulses from a number of sources have merely taken the pulses at the time they were generated and combined them, with the resulting possibility of two coincident pulses being combined to appear to be one pulse. Other systems have provided analog or quantized analog summations of measurement pulse signals.

SUMMARY OF THE INVENTION

Measurement pulses from a number of quantity-measuring devices are each applied to respective bistable storage devices. Interrogation pulses are sequentially applied to the bistable devices to cause any storage device which has received a pulse since its last interrogation to generate an output pulse. The output pulses from each bistable device are combined, in the time order of device interrogation, into a single pulse train.

DESCRIPTION OF THE PREFERRED EMBODIMENTS

Figure 1:
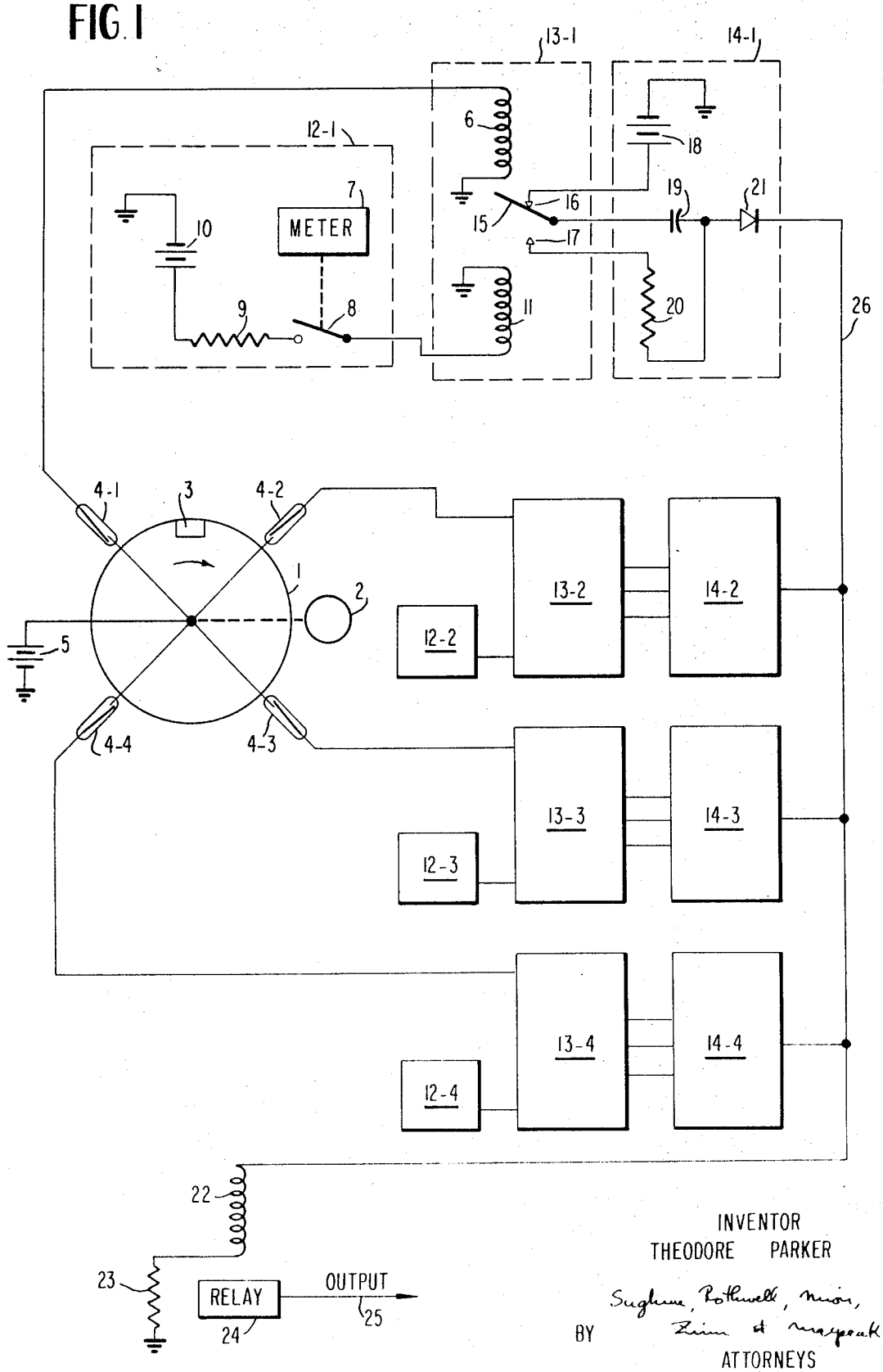
FIG. 1 is a circuit diagram of the preferred embodiment of the invention, using bistable relays as storage devices.

FIG. 1 illustrates an electromechanical embodiment of the invention.

A disc 1, which may be of some plastic material, is arranged to be rotated at some angular velocity (150 revolutions per minute in the preferred embodiment) by a motor 2. Mounted on the periphery of this disc is a magnet 3 for rotation with the disc. A suitable nonmagnetic counterbalance may be provided if desired. Four reed switches, 4–1, 4–2, 4–3 and 4–4, are shown mounted in a fixed position relative to the periphery of the disc. As the magnet passes each reed switch, it causes that switch to close for a brief instant. This combination of motor, disc, magnet and switches comprises an electromagnetic scanner. A battery 5, or any other such power source, is connected at its negative terminal to ground and at its positive terminal to one terminal of each of the four illustrated reed switches.

Throughout this specification, four elements for four channels will be shown and described. This is for convenience of illustration only, and a greater or smaller number could be used with obvious modifications.

Assuming that switch 4–1 has just been closed, a pulse of current will pass through the switch and activate coil 6 of bistable relay 13–1. This relay is of a type similar to relays 13–2, 13–3 and 13–4 and may be of the type marketed by C. P. Clare as a bistable mercury relay HGS–1019, "C". Other such relays or their equivalents could also be used. A current pulse through coil 6 will cause relay arm 15 to move into contact with contact 16. If arm 15 is already in contact with contact 16 at the time of the current pulse through coil 6, there will be no change in the arm position. Because the relay is bistable, arm 15 will remain in contact with contact 16 until changed by current through coil 11.

Elements 12–1, 12–2, 12–3 and 12–4 are separate but similar measuring devices. In the preferred embodiment these devices are used to measure the flow of some fluid through a conduit and to provide a pulse output for each unit of fluid flow measured. Other quantities could also be measured to provide pulse outputs. In element 12–1, a flow meter measures the flow of fluid and closes, then quickly opens, a switch 8, each time a unit of fluid has passed. Such meters are well known in the measuring art. When switch 8 closes and opens, a current pulse from resistor 9 and power supply 10 passes through switch 8 and through bistable relay coil 11 in relay unit 13–1. A current pulse through coil 11 will cause relay arm 15 to move into contact with contact 17. If arm 15 is already in contact with contact 17 at the time of the current pulse through coil 11, there will be no change in the arm position. Note, however, that this latter condition is impossible in a properly functioning device according to the present invention.

With the device in operation, if the meter 7 has recorded a measured unit since the bistable relay 13–1 was last interrogated by reed switch 4–1, arm 15 will be in contact with contact 17. If not, the arm will be in contact with contact 16.

If the bistable relay is storing a unit measurement when interrogated, the movement of arm 15 against contact 16 causes a pulse of relay-unit output current to flow from power supply 18 through capacitor 19 and diode 21 onto common line 26. This relay-unit output current continues until the capacitor is charged, then stops.

The next measured-unit indicating pulse moves arm 15 down to contact 17, causing capacitor 19 to discharge through resistor 18 to prepare for the next interrogation pulse.

Elements 18, 19, 20 and 21 are illustrated in block 14–1. Blocks 14–2, 14–3 and 14–4 are similar to 14–1.

The pulses entering common line 26 pass through relay coil 22 and resistor 23 to ground. The appropriate relay arm, contacts, and power supply means can be included in relay unit 24 to produce the desired total measurement pulses in output 25.

The scanning speed of the scanner unit is arranged to be greater than the maximum expected pulse rate of any one flowmeter. If a pulse is in storage at the moment of interrogation, the bistable relay will change status, causing an output pulse onto line 26. If no pulse is in storage at the moment of interrogation, the bistable relay remains stationary, maintaining the established charge on the capacitor and producing no further relay-unit output pulses.

Because the electromechanical scanner provides sequential interrogation of the individual storage circuits, incoming pulses are systematically "transferred" to the output circuit preventing the loss of simultaneous input pulses. If an input pulse is applied to a storage circuit at the moment of interrogation, the bistable relay will be controlled by the incoming pulse due to its higher current. If this situation were allowed to occur during two consecutive scans, a pulse would be lost. Since it has been specified that the scan rate must be faster than the fastest flowmeter pulse rate, the foregoing condition cannot occur; therefore, no pulses will be lost.

The size of the capacitor in the storage circuit is such that its charge time will allow the output relay to operate fully and drop out again prior to the interrogation of the next storage circuit.

Figure 2:
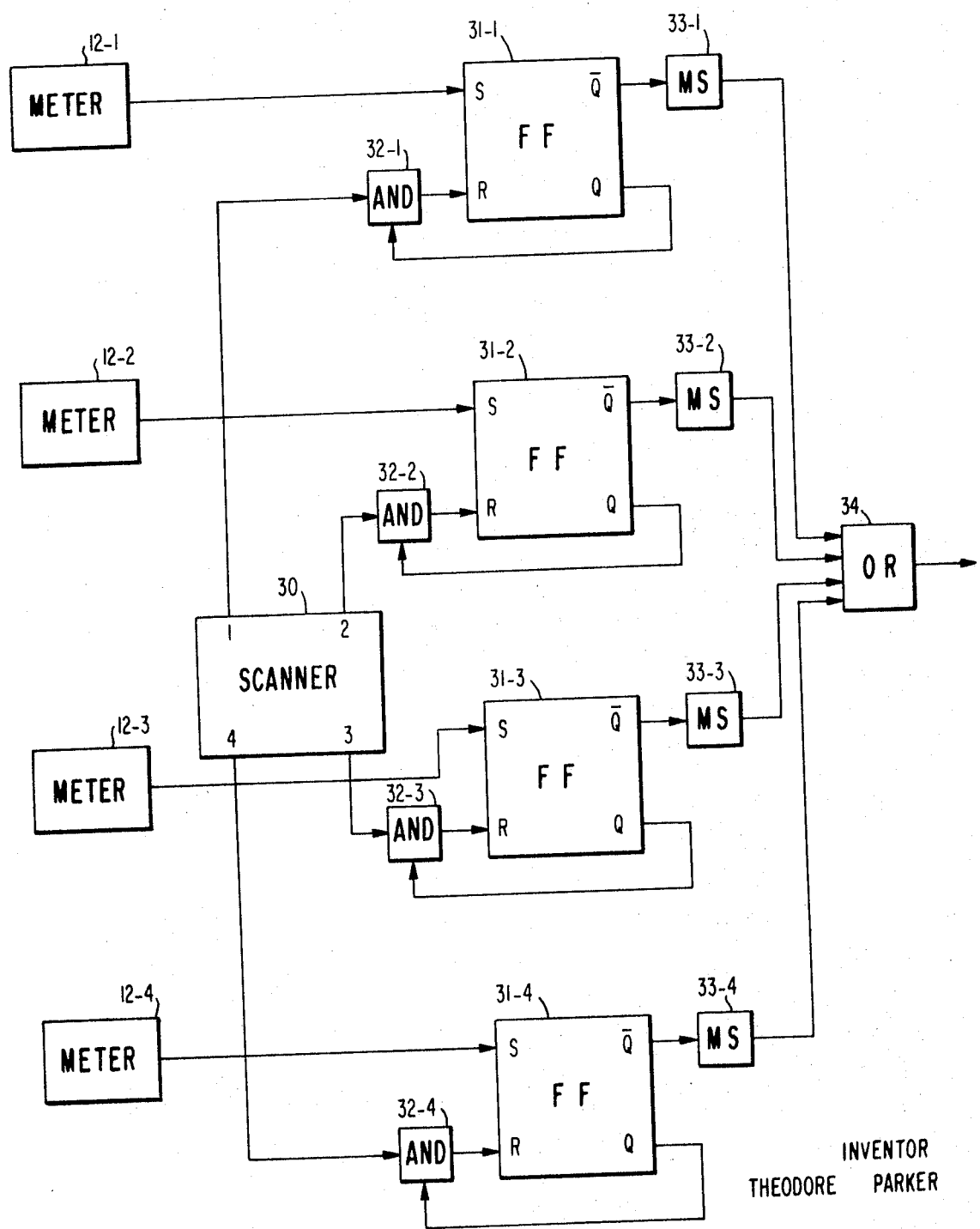
FIG. 2 is a block diagram illustrating one of the many possible ways of constructing a solid-state circuit embodying the principles of the invention.

FIG. 2 illustrates one of many possible ways in which the invention disclosed in FIG. 1 can be constructed in an all-electronic manner.

The same pulse producing meters 12–1, 12–2, 12–3 and 12–4, as disclosed in FIG. 1, provide the measurement pulses. The pulses are furnished to the set input terminals S of set-reset flip-flop 31–1, 31–2, 31–3 and 31–4. Such set-reset flip-flops are well known in the art and have the function described on page 18–03 of Handbook of Automation, Computation and Control, Vol. 2, John Wiley & Sons, 1959. The following truth table gives the outputs Q+1 and $\overline{Q}$+1 for inputs S and R where the immediately previous outputs were Q and $\overline{Q}$.

| S | R | Q+1 | $\bar{Q}$+1 |
|---|---|-----|-----|
| 0 | 0 | Q | $\bar{Q}$ |
| 0 | 1 | 0 | 1 |
| 1 | 0 | 1 | 0 |
| 1 | 1 | Unknown | Unknown |

A scanner 30, which may be equivalent to the previously described scanner having elements 1, 2, 3, 4-1 through 4-4 and 5, or which may be, for example, a periodically pulsed ring counter, provides successive pulse outputs from terminals 1, 2, 3 and 4.

An AND-gate such as 32-1 is connected to receive the scanner output pulse, such as that from terminal 1, and to receive the Q output from its associated flip-flop. If the last previous input pulse to the flip-flop was received on the set terminal S from meter 12-1, the outputs Q and $\bar{Q}$ were left respectively as 1 and 0 corresponding to the third line of the table. This condition of Q=1 causes the AND gate to be open to scanner pulses when they occur.

A scanner pulse to reset terminal R causes output $\bar{Q}$ to go from 0 to 1, triggering monostable circuit 33-1 to give a pulse output to OR circuit 34.

When Q=0, indicating that the last input pulse was received by reset terminal R, the AND-gate 32-1 is closed and will not allow the reset terminal to be triggered. This eliminates the possibility that the condition shown on line 4 of the table could exist. If the set terminal S receives a pulse, even if coincident with a reset pulse, the set condition will prevail until a reset pulse is received after the flip-flop is set.

Although only one channel has been described, the other channels are similar and also apply their outputs to the input of OR-gate 34. OR-gate 34 passes all pulses received to form a pulse train at the output.

Many more examples of the application of the present invention will suggest themselves to those skilled in the art. Alternative methods of accomplishing the invention may suggest themselves to those skilled in the art. Accordingly, the scope of the present application is limited only to the extent of the claims which follow.

I claim:

1. A system for totalizing pulses from a plurality of quantity measuring devices, comprising:
   a. a plurality of quantity measuring devices each producing a pulse per unit of measured quantity,
   b. an equal plurality of bistable elements each having first and second stable states,
   c. an equal plurality of setting means each associated with a bistable element and responsive to a pulse from an associated measuring device for setting the bistable element to its first state,
   d. an equal plurality of interrogation means each associated with a bistable element,
   e. scanning means for successively supplying pulses to each of the interrogation means at a predetermined rate, said scanning means comprising:
      1. means for moving a magnet about a closed path,
      2. a plurality of biterminal switch means situated about said closed path and each adapted to be closed by said magnet when said magnet moves in the vicinity of the switch means, and
      3. a source of potential connected to one of the terminals of each switch means, the other terminals of the switch means being connected to supply pulses at a predetermined rate,
   f. each interrogation means being responsive to a pulse from the scanning means for resetting its associated bistable element to its second state,
   g. an equal plurality of output pulse means each responsive to the transition of an associated bistable element from its first state to its second state for generating an output pulse, and
   h. means for combining all of the output pulses, at their relative times for occurrence, into a single pulse train.

2. A system according to claim 1 wherein:
   a. each said bistable element comprises the arm and contacts of a bistable relay,
   b. each said setting means comprises a first coil of said associated bistable element, and
   c. each said interrogation means comprises a second coil of said associated bistable element.

3. A system according to claim 2 wherein said output pulse means comprises:
   a. a source of potential,
   b. a capacitor having two terminals,
   c. means responsive to said interrogation means for connecting one terminal of said capacitor to said source of potential for producing said output pulse at the other terminal, and
   d. means responsive to said setting means for discharging said capacitor.

* * * * *